(12) United States Patent
Steiger, Jr.

(10) Patent No.: US 7,258,268 B2
(45) Date of Patent: Aug. 21, 2007

(54) METHOD AND APPARATUS FOR MONEY TRANSFER

(75) Inventor: Billy Joe Steiger, Jr., Ovilla, TX (US)

(73) Assignee: MoneyGram International, Inc., Minneapolis, MN (US)

( * ) Notice: Subject to any disclaimer, the term of this patent is extended or adjusted under 35 U.S.C. 154(b) by 100 days.

(21) Appl. No.: 11/068,090

(22) Filed: Feb. 28, 2005

(65) Prior Publication Data

US 2006/0191994 A1    Aug. 31, 2006

(51) Int. Cl.
*G07F 19/00* (2006.01)

(52) U.S. Cl. .................. 235/379; 235/382; 705/39

(58) Field of Classification Search ................. 235/379, 235/376; 902/5, 24, 39
See application file for complete search history.

(56) References Cited

U.S. PATENT DOCUMENTS

| | | | |
|---|---|---|---|
| 5,420,405 A | 5/1995 | Chasek | |
| 5,659,165 A | 8/1997 | Jennings et al. | |
| 5,825,003 A | 10/1998 | Jennings et al. | |
| 5,956,700 A | 9/1999 | Landry | |
| 5,963,647 A | 10/1999 | Downing et al. | |
| 6,012,048 A | 1/2000 | Gustin et al. | |
| 6,039,250 A | 3/2000 | Ito et al. | |
| 6,173,272 B1 | 1/2001 | Thomas et al. | |
| 6,267,292 B1 | 7/2001 | Walker et al. | |
| 6,317,745 B1 | 11/2001 | Thomas et al. | |
| 6,488,203 B1 | 12/2002 | Stoutenburg et al. | |
| 6,502,747 B1 | 1/2003 | Stoutenburg et al. | |
| 6,547,132 B1 | 4/2003 | Templeton et al. | |
| 6,554,184 B1 | 4/2003 | Amos | |
| 6,609,113 B1 | 8/2003 | O'Leary et al. | |
| 6,736,314 B2 | 5/2004 | Cooper et al. | |
| 6,761,309 B2 | 7/2004 | Stoutenburg et al. | |
| 6,769,605 B1 | 8/2004 | Magness | |
| 6,814,282 B2 | 11/2004 | Seifert et al. | |
| 6,827,260 B2 | 12/2004 | Stoutenburg et al. | |
| 6,886,742 B2 | 5/2005 | Stoutenburg et al. | |
| 2003/0110129 A1 | 6/2003 | Frazier et al. | |
| 2003/0222135 A1 | 12/2003 | Stoutenburg et al. | |
| 2004/0143552 A1 | 7/2004 | Weichert et al. | |
| 2004/0177014 A1 | 9/2004 | Cowell | |
| 2006/0054683 A1* | 3/2006 | Michelsen et al. | 235/379 |

* cited by examiner

Primary Examiner—Seung Ho Lee
(74) Attorney, Agent, or Firm—Dorsey & Whitney LLP

(57) ABSTRACT

A method of performing a money transfer send transaction comprises receiving information at a call center from a sender for a send transaction, including a proposed send amount, and responsive to the information from the sender received at the call center, building a staging record for the send transaction. The staging record includes compliance data responsive to the proposed send amount and to compliance rules. A data center receives information from an agent provided by the sender to the agent, with the information including a retrieval key to identify the staging record, a requested send amount and agent location information. Responsive to the requested send amount and the agent location information, the data center identifies in the compliance rules at least one applicable compliance window and tests the requested send transaction and compliance data in the staging record for consistency with the at least one applicable compliance window. Responsive to an affirmative test for consistency, the data center prompts the agent to collect from the sender payment of the requested send amount and any transaction fee and, responsive to the agent's confirmation of receipt of payment, prepares a send transaction record. Finally, the data center provides the agent a send transaction identifier for communication to the sender.

31 Claims, 10 Drawing Sheets

US TO US (EXCEPT STATE A)

| SEND FROM | SEND TO | SEND OR RECEIVE | SEND AMOUNT | ADDRESS | PHOTO ID | LEGAL ID | OCCUPATION | 3RD PARTY | OTHER COMPLIANCE INFO |
|---|---|---|---|---|---|---|---|---|---|
| US | US | SEND | A | X | | | | | |
| US | US | SEND | B | X | X | X | X | X | |
| US | US | SEND | C | X | X | X | X | X | X |
| US | US | RECEIVE | D | X | X | | | | |
| US | US | RECEIVE | E | X | X | X | X | X | |
| US | US | RECEIVE | F | X | X | X | X | X | X |

STATE A TO US

| SEND FROM | SEND TO | SEND OR RECEIVE | SEND AMOUNT | ADDRESS | PHOTO ID | LEGAL ID | OCCUPATION | 3RD PARTY | OTHER COMPLIANCE INFO |
|---|---|---|---|---|---|---|---|---|---|
| STATE A | US | SEND | A1 | X | X | | | | |
| STATE A | US | SEND | B1 | X | X | X | X | X | |
| STATE A | US | SEND | C1 | X | X | X | X | X | X |

US TO STATE A

| SEND FROM | SEND TO | SEND OR RECEIVE | SEND AMOUNT | ADDRESS | PHOTO ID | LEGAL ID | OCCUPATION | 3RD PARTY | OTHER COMPLIANCE INFO |
|---|---|---|---|---|---|---|---|---|---|
| US | STATE A | RECEIVE | D1 | X | X | | | | |
| US | STATE A | RECEIVE | E1 | X | X | | | | |
| US | STATE A | RECEIVE | F1 | X | X | X | X | X | X |

US TO OUS; OUS TO US

| SEND FROM | SEND TO | SEND OR RECEIVE | SEND AMOUNT | ADDRESS | PHOTO ID | LEGAL ID | OCCUPATION | 3RD PARTY | OTHER COMPLIANCE INFO |
|---|---|---|---|---|---|---|---|---|---|
| US | OUS | SEND | A2 | X | X | | | | |
| US | OUS | SEND | B2 | X | X | X | X | X | |
| US | OUS | SEND | C2 | X | X | X | X | X | X |
| OUS | US | RECEIVE | D2 | X | X | | | | |
| OUS | US | RECEIVE | E2 | X | X | X | X | X | |
| OUS | US | RECEIVE | F2 | X | X | X | X | X | X |

AMOUNTS A, A1, A2, B, ETC. SET FORTH IN US$ EXCEPT WHERE RULES REQUIRE USE OF FOREIGN CURRENCY.

Fig. 2

SEND TRANSACTION STAGING

| SENDER | CALL CENTER | DATA CENTER |
|---|---|---|
| SENDER CALLS WITH REGULAR PHONE OR DEDICATED PHONE WITH AUTODIAL | «CSR ANSWERS CALL<br><br>«CSR ASKS WHAT TRANSACTION DESIRED (SEND/RECEIVE/PAYMENT; THIS DISCUSSION ASSUMES MONEY SEND) | |
| >SENDER PROVIDES: SENDER NAME, ADDRESS; RECIPIENT NAME; PROPOSED SEND AMOUNT (PSA); AND ADDITIONAL TRANSACTION INFORMATION AS REQUIRED | >CSR KEYS IN INFO<br><br><br><br>CSR RECEIVES QUOTE TO REPORT TO SENDER« | >PSA AND OTHER DATA RECEIVED AND USED TO:<br><br>«PROVIDE PRICING QUOTE, DETERMINE COMPLIANCE LEVEL (BASED ON STATE AND FEDERAL REGULATIONS) AND START SEND STAGING RECORD |
| >SENDER PROVIDES COMPLIANCE INFO PER CSR REQUEST | «CSR ASKS FOR COMPLIANCE INFORMATION CORRESPONDING TO LEVEL IN COMPLIANCE CHART<br><br>>CSR KEYS IN COMPLIANCE INFO<br><br>«CSR REPORT QUOTE TO SENDER | «PROMPT FOR COMPLIANCE DATA NEEDED PER COMPLIANCE RULES, WITH COMPLIANCE LEVEL DETERMINED BY PSA AND SENDER-PROVIDED LOCATION<br><br>>RECEIVE COMPLIANCE INFO AND PUT IN STAGING RECORD FIELDS PERMITTING LATER RECOVERY |
| SENDER MAY WRITE RETRIEVAL NO. ON NOTEPAD | «RETRIEVAL NO. PROVIDED ORALLY | «STAGING RECORD COMPLETED AND RETRIEVAL NO. PROVIDED |

*Fig. 3A*

SEND TRANSACTION FINALIZING

| SENDER | AGENT | DATA CENTER |
|---|---|---|
| SENDER AT AGENT DESK | <AGENT ASKS FOR RETRIEVAL NO. AND REQUESTED SEND AMOUNT<br><br>>AGENT KEY IN RERIEVAL NO. AND AMOUNT<br><br>>TERMINAL PROVIDES AGENT LOCATION | >RECEIVE RETRIEVAL NO.<br><br>USE RETRIEVAL NO. TO RETRIEVE STAGING RECORD, DETECT TRANSACTION TYPE FROM RECORD (SEND/RECEIVE/PAYMENT) AND SEND RECORD TO AGENT (THIS DISCUSSION ASSUMES SEND, NOT RECEIVE OR PAYMENT |
|  | RETRIEVED STAGING RECORD AND SEND AMOUNT COMBINED IN TERMINAL, THEN SENT TO DATA CENTER FOR INITIAL PRICING<br><br>RECEIVE INITIAL PRICING AND DISPLAY ON TERMINAL< | <DATA CENTER COMPUTES INITIAL PRICING AND COMPLIANCE LEVELS AND SENDS TO TERMINAL |
| SENDER CONFIRMS TRANSACTION (SENDER, RECEIVER, AMOUNT, SERVICE TYPE)> | <AGENT ASKS CONSUMER TO CONFIRM TRANSACTION |  |
| >SENDER PROVIDES PHOTO ID. (NOTE THAT THE STAGING RECORD MAY CONTAIN HIGHER LEVEL COMPLIANCE DATA BUT THE CORRESPONDING VERIFICATION IS NOT REQUIRED | <AGENT ASKS FOR SENDER'S PHOTO ID (IF REQUIRED), E.G., DRIVER'S LICENSE, PASSPORT, OR ALIEN CARD<br><br>>AGENT CHECKS PHOTO ID OFFERED AND ENTERS "YES" OR "NO" AT TERMINAL FOR WHETHER ID WAS VERIFIED<br><br>RETRIEVED STAGING RECORD, SEND AMOUNT, WHETHER PHOTO ID WAS VERIFIED AND AGENT JURISDICTION SENT TO DATA CENTER> | >RETRIEVED STAGING RECORD AND SEND AMOUNT RECEIVED AT DATA CENTER TO: DEVELOP FINAL PRICING FOR SEND AND DETERMINE COMPLIANCE LEVEL (BASED ON CHART RESPONSIVE TO STATE AND FEDERAL REGULATIONS; BOTH DONE NOW WITH SPECIFIC JURISDICTION FOR AGENT |

*Fig. 3B*

| SENDER | AGENT | DATA CENTER |
|---|---|---|
| | | LOCATION KNOWN<br><br><SEND FINAL PRICING OR DECLINE TRANSACTION IF SEND AMOUNT IS OVER THE COMPLIANCE LIMIT; OR IF INSUFFICIENT COMPLIANCE DATA WAS PROVIDED IN THE REQUESTED TRANSACTION (DECLINED TRANSACTION DOES NOT PROCEED.) |
| >SENDER PAYS PRICE=SEND AMOUNT PLUS FEES | >AGENT CONFIRMS PAYMENT RECEIVED<br><br>>SEND TRANSACTION RECORD WITH SEND AMOUNT, AGENT JURISDICTION, WHETHER PHOTO ID WAS VERIFIED IS SENT TO THE DATA CENTER AGAIN FOR COMMITMENT | |
| | | SEND TRANSACTION COMMITTED. |
| | <AGENT GIVES CHANGE (IF REQUIRED), PROVIDES AGENT RECEIPT TO CONSUMER AND ASKS CONSUMER TO SIGN AGENT RECEIPT | |
| >SENDER SIGNS AND RETURNS AGENT COPY OF RECIEPT | | |
| | <AGENT PROVIDES CONSUMER RECEIPT TO SENDER. RECEIPT CONTAINS REFERENCE NO. (TRANSACTION NO.) | |

Fig. 3C

RECEIVE TRANSACTION STAGING

| RECIPIENT | CALL CENTER | DATA CENTER |
|---|---|---|
| RECIPIENT CALLS WITH REGULAR PHONE OR DEDICATED PHONE WITH AUTODIAL | <CSR ANSWERS CALL<br><br><CSR ASKS WHAT TRANSACTION DESIRED (SEND/RECEIVE/PAYMENT; THIS DISCUSSION ASSUMES MONEY RECEIVE)<br><br><IF TRANSACTION IS A RECEIVE, CSR ASKS FOR A TRANSACTION NO. | |
| >RECIPIENT PROVIDES NAME, ADDRESS, TRANSACTION NO., AMOUNT; AND ADDITIONAL TRANSACTION INFORMATION AS REQUIRED | >CSR KEYS IN INFO AND RECEIVES TRANSACTION STATUS TO REPORT TO RECIPIENT | >TRANSACTION NO. RECEIVED AND USED TO RETRIEVE COMMITTED SEND RECORD<br><br>DETERMINE COMPLIANCE LEVEL (BASED ON STATE AND FEDERAL REGULATIONS) AND START RECEIVE STAGING RECORD |
| >RECIPIENT PROVIDES COMPLIANCE INFO PER CSR REQUEST | <CSR ASKS FOR COMPLIANCE INFORMATION CORRESPONDING TO LEVEL IN COMPLIANCE CHART<br><br>>CSR KEYS IN COMPLIANCE INFO<br><br><CSR REPORTS TRANSACTION STATUS TO SENDER | <PROMPT FOR COMPLIANCE DATA NEEDED PER COMPLIANCE RULES, WITH COMPLIANCE LEVEL DETERMINED BY SENT AMOUNT AND RECIPIENT-PROVIDED LOCATION<br><br>>RECEIVE COMPLIANCE INFO AND PUT IN RECEIVE STAGING RECORD FIELDS, PERMITTING LATER RECOVERY |
| RECIPIENT MAY WRITE RERIEVAL NO. ON NOTEPAD | <RETRIEVAL NO. PROVIDED ORALLY | <RECEIVE STAGING RECORD COMPLETED<br><br><RETRIEVAL NO. PROVIDED |

*Fig. 4A*

RECEIVE TRANSACTION FULFILLMENT

| RECIPIENT | AGENT | DATA CENTER |
|---|---|---|
| RECIPIENT AT AGENT DESK | <AGENT ASKS FOR RETRIEVAL NO. AND AMOUNT<br><br>>AGENT KEYS IN RETRIEVAL NO. AND AMOUNT<br><br>>TERMINAL PROVIDES AGENT LOCATION | >RECEIVE RETRIEVAL NO.<br><br>USE RETRIEVAL NO. TO RETRIEVE RECEIVE STAGING RECORD, DETECT TRANSACTION TYPE FROM RECORD (SEND/RECEIVE/PAYMENT) AND SEND RECORD TO AGENT (THIS DISCUSSION ASSUMES RECEIVE, NOT SEND OR PAYMENT) |
|  | RETRIEVED STAGING RECORD AND ASSOCIATED TRANSACTION INFORMATION, INCLUDING AMOUNT COMBINED IN TERMINAL, THEN SENT TO DATA CENTER FOR COMPLIANCE ANALYSIS AND STATUS<br><br>TERMINAL RECEIVES TRANSACTION RECORD AND DISPLAYS ON TERMINAL< | <DATE CENTER FINDS TRANSACTION RECORD, DETERMINES COMPLIANCE LEVEL AND TRANSACTION STATUS AND SENDS TO TERMINAL |
| RECIPIENT CONFIRMS TRANSACTION (SENDER, RECIPIENT, AND AMOUNT,)> | <AGENT ASKS RECIPIENT TO CONFIRM TRANSACTION |  |
| >RECIPIENT PROVIDES PHOTO ID. (NOTE THAT THE STAGING RECORD MAY CONTAIN HIGHER LEVEL COMPLIANCE DATA BUT THE CORRESPONDING VERIFICATION IS NOT REQUIRED.) | <AGENT ASKS FOR RECIPIENT'S PHOTO ID (IF REQUIRED), E.G., DRIVER'S LICENSE, PASSPORT, OR ALIEN CARD.<br><br>>AGENT CHECKS PHOTO ID OFFERED, AND ENTERS "YES" OR "NO" AT TERMINAL FOR WHETHER ID WAS VERIFIED.<br><br>RETRIEVED STAGING RECORD, AMOUNT, WHETHER PHOTO ID WAS VERIFIED AND AGENT LOCATION SENT TO DATA CENTER> | >RETRIEVED STAGING RECORD AND AMOUNT RECEIVED AT DATA CENTER TO: DETERMINE COMPLIANCE LEVEL (BASED ON CHART RESPONSIVE TO STATE AND FEDERAL REGULATIONS; BOTH DONE NOW |

*Fig. 4B*

RECEIVE TRANSACTION FULFILLMENT

| RECIPIENT | AGENT | DATA CENTER |
|---|---|---|
|  |  | WITH SPECIFIC STATE FOR AGENT LOCATION) KNOWN) <RECEIVE ACCEPTANCE OR DECLINE TRANSACTION IF AMOUNT IS OVER THE COMPLIANCE LIMIT; OR IF INSUFFICIENT COMPLIANCE DATA WAS PROVIDED IN THE REQUESTED TRANSACTION OR IF TRANSACTION STATUS IS "ALREADY RECEIVED." (DECLINED TRANSACTION DOES NOT PROCEED.) |
|  | IF TRANSACTION FAILS, AGENT NOTIFIES RECIPIENT THAT TRANSACTION NEEDS TO BE RESTAGED |  |
| >RECIPIENT CONFIRMS PAYOUT METHODS TO AGENT<br><br>RECIPIENT SIGNS AND RETURNS AGENT COPY OF RECEIPT | <AGENT ASKS RECIPIENT FOR PAYOUT METHODS., E.G., CASH, CHECK, ETC.<br><br><AGENT GIVES MONY TO RECIPIENT IN THE FORM OF THE PAYOUT METHOD(S) SELECTED ALONG WITH AGENT RECEIPT, AND ASKS REIPIENT TO SIGN AGENT RECEIPT<br><br>AGENT TERMINAL NOTIFIES PAYOUT TO DATA CENTER><br><br><AGENT PROVIDES CONSUMER RECEIPT TO RECIPIENT. RECEIPT CONTAINS REFERENCE NO. (TRANSACTION NO.) | DATA CENTER MARKS TRANSACTION RECORD WITH PAID OUT TRANSACTION STATUS |

*Fig. 4C*

| SEND TRANSACTION STAGING RECORD | 500 |
|---|---|
| STAGING RETRIEVAL KEY | 510 |
| SENDER NAME | 512 |
| SENDER ID DATA | 514 |
| RECIPIENT NAME/LOCATION | 516 |
| RECIPIENT SECURITY DATA | 518 |
| COMPLIANCE DATA | 520 |
| ADDITIONAL TRANSACTION INFORMATION | 522 |
| EXPIRATION DATE | 524 |

*Fig. 5A*

| COMMITTED SEND TRANSACTION RECORD | 550 |
|---|---|
| SEND TRANSACTION KEY OR IDENTIFIER | 560 |
| SEND AMOUNT | 562 |
| SERVICE TYPE | 564 |
| FEES | 566 |
| SENDER NAME | 568 |
| SENDER ID DATA | 570 |
| RECIPIENT NAME/LOCATION | 572 |
| RECIPIENT SECURITY DATA | 574 |
| COMPLIANCE DATA | 576 |
| ADDITIONAL TRANSACTION INFORMATION | 578 |
| RETENTION INFORMATION | 580 |
| STATUS | 582 |

*Fig. 5B*

| RECEIVE TRANSACTION STAGING RECORD | — 600 |
| --- | --- |
| STAGING RETRIEVAL KEY | — 610 |
| RECIPIENT NAME | — 612 |
| RECIPIENT ID DATA | — 614 |
| SEND TRANSACTION POINTER | — 616 |
| RECIPIENT SECURITY DATA | — 618 |
| COMPLIANCE DATA | — 620 |
| ADDITIONAL TRANSACTION INFORMATION | — 622 |
| EXPIRATION DATE | — 624 |

Fig. 6

METHOD AND APPARATUS FOR MONEY TRANSFER

BACKGROUND OF THE INVENTION

The present invention relates to an apparatus and methods for transferring money or monetary value. More specifically, the present invention relates to a system for managing data to effect send, receive and payment transactions for money transfers.

It is increasingly common for funds to be transferred electronically This can occur from individual to individual or from business to business or between an individual and a business. The transfers may occur within one country or across borders, from one country into another, and thus may involve a currency change.

In some cases one or both of the individuals or businesses involved may lack an account at a bank or a credit card. Thus, the funds for the transfer often must be provided in cash (or equivalent) and the payout to the recipient may also preferably be in cash (or equivalent).

Large bank and non-bank financial institutions are involved in money transfers. To extend their geographical coverage, the institutions engage agents and may equip them with specialized terminals or other facilities. The personnel of such agents may not be well educated or highly trained and may do several other tasks (such as service as retail sales clerks). This requires a system that is easy to use, deters mistakes and fraud and minimizes agent personnel time.

Although the convenience and need for non-bank money transfers is well recognized and most transactions are entirely legitimate, governments have become concerned about transfers of these kinds being used to fund terrorism or to assist in various criminal enterprises. Governments are also concerned about consumer protection. Increasingly, governments regulate such money transfers. These laws and regulations include both state and federal levels, which may differ. The applicable laws and regulations may involve more than one nation's legal system. Thus, entities involved in money transfers must introduce complex procedural disciplines and keep records to conform to the laws and regulations.

To be economically efficient, companies involved in money transfers must follow the market for fees and, if they perform transfers involving a change in currency, they must use highly current rates of exchange. For money transfer transactions the timing for bringing together current, necessary fee and exchange rate information relative to when payment is made by the sender may be important.

To make money transfers efficient and to handle the large volume, electronic systems are used and personnel time is minimized. Thus, there is a need for improved money transfer systems and methods that assist the parties involving in conforming to government regulations, that provide procedures to minimize the amount of personnel time per transaction and that are otherwise economically efficient.

BRIEF SUMMARY OF THE INVENTION

The present invention, in one embodiment, is a method of performing a money transfer send transaction comprising: receiving information at a call center from a sender for a send transaction, including a proposed send amount; responsive to the information from the sender received at the call center, building a staging record for the send transaction, said staging record including compliance data responsive to the proposed send amount and to compliance rules; receiving information from an agent provided by the sender to the agent, said information including a retrieval key to identify a staging record, a requested send amount and agent location information; responsive to the requested send amount and the agent location information, identifying in the compliance rules at least one applicable compliance window; testing the requested send transaction for consistency with the at least one applicable compliance window; responsive to an affirmative test for consistency, prompting the agent to collect from the sender payment of the requested send amount and any transaction fee; responsive to the agent's confirmation of receipt of payment, preparing a send transaction record; and providing to the agent a send transaction identifier for communication to the sender.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the drawings and detailed description are to be regarded as illustrative in nature and not restrictive.

BRIEF DESCRIPTION OF THE DRAWINGS

FIG. 2 is a chart showing an example of transaction amount ranges and the corresponding required identification and information, developed for a money transfer system, based on government laws and regulations.

FIG. 3 is chart showing interactions involved in performing money transfer send transaction staging and funding/finalizing.

FIG. 4 is a chart showing interactions involved in performing money transfer receive transaction staging and fulfillment.

FIGS. 5*a*–5*b* are schematic diagrams showing the fields used in a send staging record and in a committed send transaction record.

FIG. 6 is a schematic diagram showing the fields used in a receive staging record.

DETAILED DESCRIPTION

Figure 1:
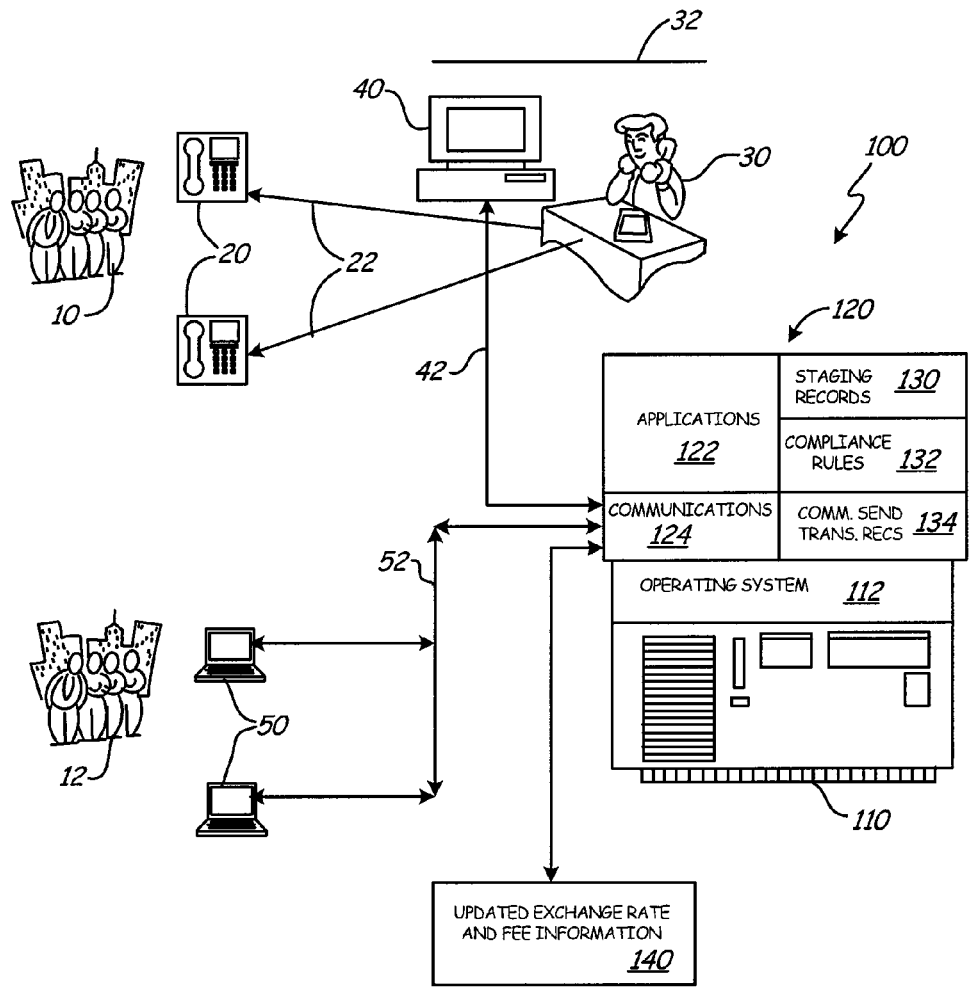
FIG. 1 is a schematic block diagram of a system for performing money transfer send, receive and payment transactions.

Basic Elements of System. FIG. 1 is a schematic block diagram of a system 100 for performing money transfer send and receive transactions. In the system as shown in FIG. 1, users (who at various times may be senders or recipients) 10 use a telephone or other communication device 20 to contact a customer service representative (CSR) 30 at a call center (or network) 32. The CSR will be one of several working at the center (or network) 32 and receiving communications from users 10 using one of the plurality of communication devices 20. The devices 20 are spread over the geography served by a financial institution that operates the money transfer system. For example, a device 20 may be a home telephone or may be a dedicated telephone located at an agent office. One purpose of a user-CSR interaction is for a sender to stage a send transaction from the sender to a person or entity, who may be located in the same country or in a different country from the sender. A second purpose of a user-CSR transaction is for a recipient to stage a receive transaction, once a committed send transaction makes funds available. A common purpose in both of these situations is to do much of the compliance work and other transaction preparation, so as to reduce the activity and time that is required in the later interaction with an agent.

FIG. 1 also shows that persons 12 who are senders who have staged a transfer or recipients who have staged a receive transaction may go to an agent office where there are agent terminals 50. There may be one or more agent offices with one or more agent terminals 50 spread over the geography served by a financial institution that operates the money transfer system. The agent terminals 50 typically are set up to handle at least two kinds of interactions and transactions. First, if the sender 12 has previously dealt with a CSR and set up a send staging record, then the sender will go to the agent office to finalize the send with an actual requested send amount and fees and to make the payment to the agent that enables the send to be finalized. Second, if the send transaction has already been funded and finalized and the committed transaction record is available for receiving at agent terminals 50 (typically the recipient has staged the receive transaction), the recipient 12 can go to an agent office to obtain the funds sent.

FIG. 1 shows that the CSR 30 has a terminal 40 that is used to build a send staging record based on information provided to the CSR by the sender 10 or a receive staging record based on information provided to the CSR by a recipient 10. The terminal 40 is in communication with a central computer system or data center 120 via a transmission path 42, which may be a telephone line, data line, or other wired or wireless link, e.g., a leased line or a link using the Internet. The transmission path 42 terminates at a communications module 124 that can pass information to and from any of the software modules running on the hardware 110 and its operating system 112. The software modules include applications 122 that implement the various functions discussed below. The data used by applications 122 and other software includes staging records 130, records incorporating compliance rules 132 and committed send transaction records 134. These may be in one or more separate databases. In one embodiment, separate databases are used, because the committed send transactions are in a financial records database that is protected with greater security measures.

FIG. 1 also shows that agent terminals 50 are in communication with the central computer system or data center 120 via a transmission path 52, which may be a telephone line, data line, or wired or wireless link. The transmission path 52 terminates at the communications module 124. FIG. 1 further shows that the central computer 120 receives updated exchange rate and fee information from data source 140, which derives the information from various market data and internal sources of the financial institution.

Automation of portions of the system as shown in FIG. 1 is possible. In one embodiment, where the device 20 is a telephone, the terminal 40 is an automated voice-response terminal and the human CSR's functions are taken over by the terminal 40 and its controlling software. In another embodiment, the device 20 is itself a terminal 40 at which a user 10 is guided through entry of information at a keyboard, touch-screen or other similar device to provide information to a terminal where there is a human CSR to review the inputs and intervene if needed, or the device 20 may interact with an automated terminal 40 or with software running on a CPU at the terminal 40 or at the data center 120. In the latter case, functions of the call center 32 and the CSR are performed as part of the data center 120 operations. Interactions with the CSR become telecommunications interactions with software executing at the data center 120. The call center 32 becomes a component of the data center 120. In these scenarios, as in the less-automated situation depicted in FIG. 1, the user input by voice or manual entry provides the information necessary to build the staging record for the desired transaction.

The call center 32 may be a single geographical location or a number of locations linked together to provide sufficient CSR's 30 and/or terminals 40, with appropriate language capability to effectively handle the contacts initiated at the devices 20. Because the devices 20 may be located in multiple jurisdictions and the CSR's would typically not be in the same jurisdiction as the users, during the CSR-user interaction the CSR 30 must obtain location information relevant to the transaction from the user 10 at the specific device 20 employed by the user 10.

As noted above, the money transfer operations of interest are subject to state and/or federal laws and regulations (and potentially laws of multiple nations). The financial institution needs to ensure as far as possible that all its money transfer transactions are executed in compliance with the applicable laws and regulations. These vary by jurisdiction. Thus, the applications 122 that are used to stage and carry through send transactions and receive transactions are configured to apply the necessary laws and regulations by the way the software applications 122 are written and by software interaction with compliance rules that may be specified in a compliance rules data base 132.

Compliance Rules. FIG. 2 shows an example of the kind of compliance rules that may be implemented in a data structure and database in a money transfer system. In this simplified example, there are U.S. laws and regulations, and State A within the U.S. has its own laws and regulations for money transfer send transactions that originate within its borders and money transfer receive transactions that occur with a recipient going to an agent within its borders. The example also shows that transactions between the U.S. and a country outside the U.S. ("OUS") may have different compliance rules than for transactions where the sender and recipient are both in the U.S.

The general nature of these laws and regulations is that they include identification requirements, which escalate as the transaction amount increases. This applies to both send and receive money transfer transactions. There usually is also an absolute maximum amount that can be sent or received. When a transaction occurs within the U.S. and does not involve State A and, assuming for simplicity that no other states have applicable laws and regulations, then the federal laws and regulations apply. When a transaction occurs across U.S. borders, at a minimum U.S. laws and regulations must be applied, whether the transfer is from the U.S. or into the U.S. State laws and regulations may also be applicable. As countries outside the U.S. become interested in regulating money transfers, these will develop laws and regulations that will apply when a transaction has certain relationships to such countries.

FIG. 2 thus shows a set of compliance rules based on laws and regulations for send and receive transactions within the U.S., but not involving a sender or a recipient in State A ("US to US"). FIG. 2 also shows a separate set of compliance rules based on laws and regulations for send and receive transactions within the U.S., where there is a sender or a recipient subject to the laws of State A ("State A to US"; "US to State A"). Finally, FIG. 2 shows a separate set of compliance rules that may apply for money transfers that cross a U.S. border with the send or the receive occurring in the U.S., but the corresponding receive or send occurring outside the U.S. ("US to OUS"; "OUS to US"). This table may have parameters selected to satisfy U.S. law, the law of a particular state and also laws of a jurisdiction outside the U.S.

The compliance rules may use compliance criteria that match exactly the laws and regulations of the applicable jurisdictions or criteria that are somewhat more stringent but perhaps easier to implement, e.g., taking into account agent resources and risks or configured to satisfy or be compatible with the legal regimes of more than one jurisdiction. The financial institution may by reason of its own concerns about fraud, require more or different identification/information (or the same identification but for lower amounts transferred) than what the laws or regulations would require. Typically, the laws and regulations create at least two ranges for transaction size, a first, lower range (or first transaction size "window") from zero (or some minimum) up to a first maximum send/receive amount, and a second, higher range (or second transaction size "window") from the first maximum up to a second maximum send/receive amount. Frequently three ranges (or "windows") defined by the maximum send/receive amount are involved, and the tables in FIG. 2 show this. Each window has corresponding compliance data requirements (appearing in FIG. 2 to the right of the amount column).

Thus, in the table for the U.S. shown first in FIG. 2, for send transactions, the first range runs from $0.01 up to $A and the second range runs from $A to $B, where B is greater than A, while the third range runs from $B up to $C, where C is greater than B. For example, the following actual amounts might be used: A=$300, B=$600 and C=$5000. Further, in the table for the U.S. shown first in FIG. 2, for receive transactions, the first range runs from $0.01 up to $D and the second range runs from $D to $E, where E is greater than D, while the third range runs from $E up to $F, where F is greater than E. For example, the following actual amounts might be used: D=$400, E=$800 and F=$8000. Of course, the amounts could also be the same for the each of the corresponding levels on the send and receive charts, such that A=D, B=E and C=F, or the same for just some levels.

The tables for transactions involving state A have levels, A1, B1, C1, D1, E1, F1, which may differ from the previously-discussed U.S. table in at least one of the level values and perhaps in all. Similarly, the tables for transactions involving the U.S. and a foreign (OUS) country have levels, A2, B2, C2, D2, E2, F2, which may differ from the U.S. table or the state A chart in at least one of the level values and perhaps in all. In particular, the chart may need to express some levels in a foreign currency instead of a U.S. dollar equivalent. More (or fewer) charts and levels can be implemented in the compliance rules database 132, as required for compliance with the laws and regulations governing where the institution wants to offer service.

As presently configured, the three sets of charts each have three windows for send transactions and for receive transactions. Also each of the three send windows in each set have the same compliance data at the corresponding middle and high levels and each of the three receive windows in each set have the same compliance data at the corresponding low, middle and high levels. Thus, if a transaction falls in the middle level send window in any chart, the compliance data rules for the middle level send window in any other chart will be the same, even if the amount ranges defining the window are different. However, the charts may also be configured so that the windows at any level could differ not only in the ranges for transaction amount but also in the required compliance data Or the charts could have the same amount ranges but with different required compliance data The common compliance data requirements at all or most of the respective levels (as shown in FIG. 2) simplify compliance analysis and moving from one set of compliance rules to another.

As will be seen below, in the course of staging a transaction, the CSR will collect sender and recipient location information and use that to determine the applicable jurisdiction (e.g., U.S., State A, OUS country) for a staging phase compliance analysis of both the send and receive sides. This information is often simply what the user verbally reports to the CSR and may not be reliable. Locations reported also may not be the same as the location of a send agent later used to finalize the staged transaction or of the receive agent. Thus, when a send or receive transaction is actually finalized, the actual geographic location of the agent involved will be reported to or determined by the system. This can again be a value reported to or known to the agent, but is preferably a programmed value that is part of an agent terminal profile, specified when the terminal is installed and configured, so that no person need be trusted to accurately or honestly provide the information for determining compliance. The programmed value may be an actual jurisdiction name or code or an address or Zip code or some agent identifier from which the applicable jurisdiction may be found. Alternatively, a real-time GPS location signal might be used to find the location and derive the applicable compliance jurisdiction, if the configured information was not reliable or if the agent terminal might be mobile.

As can be seen from the compliance rules tables in FIG. 2, each row represents a compliance level, i.e., a window or range with corresponding compliance data requirements for transactions in that range. The lowest send amounts may require the sender or recipient to provide an address or an address and photo ID. The larger send amounts may, in addition to the requirements of the lower level(s), require a legal ID (e.g., drivers license, passport, alien card, etc.), occupation information and perhaps other compliance information. In addition, if a third party assists a sender or recipient (e.g., a son/daughter aiding a disabled parent) identification of the third party may be required for the staging record. While the tables in FIG. 2 are relatively simple and might be grasped and implemented by skilled personnel without being built into software, it should be noted that for less skilled personnel, applying these rules consistently could be a challenge. With any significant increase in the number of jurisdictions with separate laws and regulations, the task becomes difficult or impossible to perform consistently even for a skilled person. A further issue is that some personnel may desire to avoid the rules, if they are not made mandatory by the system. As a result, the software implementing the compliance rules is an effective way to provide both guidance and discipline to ensure compliance. The compliance rules 132 may be implemented at the data center 120 as shown, at the CSR terminals 40 or at the agent terminals 50, or at more than one of these. Implementation at the data center 120 and remote communication as needed simplifies any updating required.

Methods and Interactions. In the prior art, it has been typical for send transactions to have both a staging phase and a funding or fulfillment phase. For example, in accordance with some of the teachings of U.S. Pat. No. 6,502,747, a sender has direct access to an employee of a financial services institution and provides the employee send transaction details. These details are stored in a database and typically include the desired amount of money to be sent. A code is then established for the sender to use during the send transaction, i.e., in fulfillment. The sender enters or causes to be entered into an electronic transaction fulfillment device the code, which causes the stored transaction details to be retrieved. The amount of money to be collected from the sender is computed and the sender pays this amount to set up the send transaction. Once the send transaction is established, the sender can inform the recipient and provide the recipient with any transaction identification number or information that may be required. The recipient can then proceed to an agent of the financial services institution and present identification or whatever is required to release to the recipient the amount sent.

In this kind of system it has been noted that some issues occur. The sender may arrive at the fulfillment site with too little funds to fulfill the staged transaction, either by misunderstanding or because there has been a change in pricing or the sender changes his/her mind. The transaction as staged must then be corrected somehow. This either takes agent time or leads back to another staging interaction. The sender may stage the send transaction in one jurisdiction and fulfill it in another. In that case, the compliance work done in staging may no longer be appropriate. The transaction as fulfilled may no longer be in compliance and may need to be re-staged. These situations could result in compliance violations. They can decrease efficiency and thus increase cost to the financial institution and/or agent. They can also be frustrating to customers.

In the present system and method, the staging record is created in a CSR interaction without being tied to a fixed send amount. Instead, a compliance window or range is identified based on proposed send amount, then-available location information and the compliance rules. The CSR requests and sends to the data center the compliance data required by the applicable compliance level rules and provided by the sender. The provided compliance data is documented in the staging record. That is, the staging record is applicable to a range of transactions according to the compliance window applied and the compliance requirements that have been met for that window. With an efficiently defined compliance rule set, a higher level staging record is applicable also to "lower" compliance windows (at least in the same jurisdiction).

At the agent, the sender provides a requested send amount as part of finalizing the transaction. Responsive to the amount and the agent location, the system performs a second analysis using the applicable compliance rules to identify the specific applicable compliance windows on the send and receive side. The system then proceeds to determine if the transaction can be finalized. It must be consistent with the compliance windows determined based on proposed send amount and on the specific location of the agent who will collect the funds and the expected location for the receive, taking into consideration the compliance data provided by the sender and documented in the staging record. Assuming the transaction to be finalized is consistent with the now-identified compliance windows (which may be the same as the ones identified at staging or may be different), the transaction can proceed. If required by an applicable compliance window, the agent is prompted to confirm that the sender presents identification that matches at least a portion of the compliance data stored. Assuming compliance requirements are met, the agent can finalize the send transaction. As will be seen, the compliance windows identified as governing for the send staging record may be used to test compliance of the transaction to be finalized, or, based on revisiting the compliance rules, new compliance windows may be identified and applied. In most instances, the transaction staging will work to set up finalizing, because the send amount that the user requests at the agent is within the compliance windows that govern for finalizing and the compliance data are already in place in the staging record. However, the compliance rules are re-applied during finalizing, and if testing of the transaction to be finalized determines that it is not consistent with the compliance windows now identified as governing, it must be rejected or made to conform. This may mean lowering the amount of the send to fit a lower level compliance window. The agent can change this parameter and resubmit the transaction. A transaction that cannot be made to conform by lowering the amount requires restaging. (Although a terminal at the agent could be configured and connected to permit a transaction to be restaged at the agent, the usual business model for agents makes it desirable for them to spend only a limited time on each user interaction.)

FIG. 3 shows one embodiment of the interactions that are part of the method and implemented in the system of the present application for a send transaction. As set forth in FIG. 3, the method has a phase for send transaction staging and a subsequent phase for send transaction finalizing. FIG. 3 in its three columns shows actions and communications (direction indicated by ">" or "<") for sender, call center and data center (central computer system). The actions and communications involved in send transaction staging start at the top left of the first chart in FIG. 3 and progress downward and across and back. Similarly, the second chart in FIG. 3 shows actions and communications involved in send transaction finalizing. Reference should be made to these charts for the details of the actions and communications.

FIG. 3 shows the application of compliance rules 132 stored at the data center 120 (FIG. 1). In send transaction staging, the sender provides: sender name, address; recipient name and location; proposed send amount (PSA); and additional transaction information as required. The CSR keys in the information and communicates it to the data center. The data center receives the PSA and other data and uses these to provide a pricing quote, determine a compliance level and window (based on applicable regulations) and start a send staging record. The sender address or location information and recipient location are used at the data center to determine pricing (for which the institution may have regional or agent group variations) and to do the initial determination on what compliance rules apply. The CSR receives the quote to report to sender. The data center prompts the CSR for compliance data needed per compliance rules, responsive to the compliance level determined by the PSA and sender-provided locations. The CSR asks for compliance information corresponding to the applicable levels (windows) in the applicable compliance rules chart. Both the send side and the receive side of the transaction must be compliant, so both the send and receive portions of the applicable charts in FIG. 2 are checked. The sender provides the compliance data per CSR request. The data center receives and processes compliance data and stores the resulting compliance data in staging record fields, with a retrieval no. (retrieval key) facilitating later recovery. The CSR reports the price quote to the sender.

In defining the request for compliance information that the CSR makes, the data center will apply the compliance rules to identify the compliance windows that govern and determine the corresponding required levels of compliance information and the compliance data to be stored for that level. For example, if the location provided by the sender indicates the "US to US" send rules apply, then the data center uses the PSA to determine which one of the following windows and corresponding compliance data applies:

$0.01 up to $A: address $A up to $B: compliance data for level below, plus photo ID, defined by ID Type, ID no., ID issuer and Legal ID, $B up to $C: compliance data for level below, plus occupation, any $3^{rd}$ party information and other compliance information.

Once the sender has provided and the staging record includes the required compliance data, the sender will be able to use the staging record for finalizing any send transaction that is within the corresponding window or any window "below" it (i.e., a window with lesser compliance data requirements, encompassed by the level above), unless changed circumstances cause another compliance window to be the governing one.

The actual format of the compliance data as stored at staging can vary. In one embodiment, the compliance data mirrors all the data actually provided by the sender, i.e., ID type, issuing authority, ID number, etc. In another embodiment, one or more compliance level codes or derived values is used to represent parts of the compliance data or to specify the compliance window or an aspect of it. In a further embodiment, the compliance data is summarized in the form of the maximum PSA that defines the compliance window for a particular jurisdiction. Other variations are possible, but the common element is that the staging record captures the results of the initial analysis to establish the applicable compliance windows and to collect the compliance data required. When the sender attempts to finalize a send transaction at an agent, the compliance rules are re-applied to determine what compliance windows are applicable, and the staging record is consulted to see what compliance data is already collected. This provides a basis for testing a requested send amount that is about to be funded at a particular agent, against the now-identified governing compliance windows, to see if the requested send amount and existing compliance data are consistent with the applicable compliance rules. This will also determine what actual identification documentation (if any) the agent is instructed to review and report as viewed/not viewed.

In finalizing a send transaction, the information of the send staging record is referenced and portions re-used to formulate a committed send transaction record. Because funds will be collected at the agent and the financial institution will commit to mailing a payout, pricing (including fees and any applicable exchange rate) may be re-checked and compliance re-determined as needed. As seen in the send transaction finalizing portion of FIG. 3, there are interactions between the sender, the agent and the data center. (The agent may be a person with a terminal or an un-staffed terminal (kiosk) sufficiently automated to perform both the interaction and communication functions.) To start finalizing, the agent asks the sender for the retrieval no. supplied upon completion of send staging and the requested send amount. This amount may be the same as or different from the proposed send amount discussed in staging. The agent keys in the retrieval no. and amount. In one embodiment, the terminal provides agent location information (but this could also be done by manual entry by the agent). The data center receives the retrieval no. and use the retrieval no. to retrieve the staging record. The data center detects transaction type from the record (send/receive/payment) and sends the record to the agent.

At the agent, the retrieved staging record and send amount are combined in the terminal 50, then sent to the data center 120 for initial pricing. The data center computes the initial pricing and applies compliance rules and sends results to terminal 50. It should be noted that the data center has now redetermined compliance using the requested send amount and the location information from the terminal 50, which may be different from location information used for compliance for the staging record. The data center 120 communicates its determinations to the agent terminal 50 and (assuming the test for consistency with compliance rules is affirmative, i.e., the transaction to be finalized fits the applicable compliance windows) the agent asks the sender to confirm the transaction. Once the sender confirms the transaction, the agent asks for the sender's photo ID (if required), e.g., driver's license, passport, or alien card or for some other documentation that is relevant to the compliance data required and stored in the staging record. The sender provides the photo ID. The agent checks the photo ID offered and enters "Yes" or "No" at the terminal to indicate whether the photo ID (issuer, name, number, etc.) was verified. The retrieved staging record and send amount transmitted from the agent terminal 50 are used at the data center to: develop final pricing for the send and make a final check on compliance (based on the compliance rules in the charts (FIG. 2) embodying state and federal regulations. Both determinations are done now with the final amount and specific jurisdiction for the agent location known. The data center either sends final pricing or declines the transaction, if the test against the applicable compliance windows is not affirmative. This can occur when the send amount is over a compliance window limit; or if insufficient compliance data has been recorded for the requested send transaction (under the now applicable compliance requirements).

Because the compliance rules are configured with windows or ranges for amounts and with the same or relatively uniform compliance data requirements at the respective levels (with more compliance data required for higher levels), the transaction presented to the agent usually will be able to proceed. However, if the user increased the send amount or if the user has now used an agent located in a jurisdiction different than where staging was located, then different pricing and compliance rules may be applied. If these cause the transaction presented to be inconsistent with the compliance data recorded in staging (viewed under the applicable compliance windows), then the transaction may require re-staging. A change in currency exchange rates may also arise between the time of staging and the time of finalizing a send, and final pricing will be affected. After the sender pays the price (equal to the send amount plus fees), the agent confirms payment has been received and the agent terminal sends the transaction record with send amount, agent jurisdiction, and (if required) whether photo ID was verified to the data center again for commitment. The agent gives change, gets a signed receipt and provides a consumer receipt to the sender. The receipt has the reference no. assigned (committed send transaction no.). The transaction is committed at the data center by completing the committed send transaction record, with the status marked as open for payment (ready to receive).

Some examples show how the final test for consistency with compliance rules work. If a sender staged based on a send amount that was acceptable in staging as less than $A and less than $D under US to US compliance rules, but at an agent in the same jurisdiction used for staging the sender requests to send $X, falling in the compliance windows $A up to $B and/or $D up to $E, then the compliance window used for staging will be exceeded. The transaction will need to be reduced below $A and $D or to be restaged with a CSR collecting all needed compliance data for a higher-level compliance window. Similarly, if, for example, the sender staged a send that was acceptable as less than $A and $D under US to US compliance rules and now requests to send the same from State A, the data center needs to determine whether the amount falls in the compliance windows $0.01 up to $A1 or in $A1 up to $B1 and $0.01 up to $D1 and $D1 up to $E1, because $A and $A1 and $D and $D1 may not be the same. If a compliance window defined by the compliance rules of State A and now identified as applicable has been exceeded, the transaction will need to be reduced or restaged, with a CSR collecting all needed compliance data under the rules for the applicable level of compliance for a send from State A.

FIG. 4 shows the interactions that are part of the method and implemented in the system of the present application for a receive transaction. As set forth in FIG. 4, the method has a phase for receive transaction staging and a subsequent phase for receive transaction fulfillment. As with the actions and communications in FIG. 3, the information provided to the CSR and the later interaction with the agent lead to two separate compliance rule analyses, which may lead to different results, if the same compliance rules are not applied. For a receive, the sent amount is fixed, so there will be no problem from a change in that amount, but there can be different jurisdictions involved in receive staging and in fulfilling a receive. Thus, the actions and communications in FIG. 4 for a receive staging and fulfillment are very similar to FIG. 3, but simpler. One difference is that the receive can only be staged if the transaction status is unpaid (open for payment). Obviously, as soon as a recipient payout has occurred, the transaction status will go from unpaid to paid, to avoid duplicate payout. A second difference is that in receive fulfillment, the agent is not collecting money but paying it out, according to guidance from the agent terminal. Details can be found in FIG. 4.

Compliance Table Interaction. In determining compliance rules, the applications 122 may need to apply compliance rules from more than one jurisdiction. To address this, the application logic can either (a) perform a computation that combines two or more compliance rule tables into a table that contains the strictest requirements for transactions of various size ranges, or (b) apply the tables of multiple jurisdictions sequentially for a given transaction, using a rule that selects the strictest requirement on both the send and receive sides applicable to a particular transaction size. The former may lead (in effect) to more compliance windows being defined, so that compliance windows are combined for a range where they require the same compliance data, but for any range where the multiple tables to be applied specify different compliance data, a new sub-range is defined that states the strictest rules. Thus, a transaction will be staged or finalized so as to satisfy the requirements of all applicable compliance rules by applying the strictest requirements of the applicable compliance windows.

Data Structures. The use of the system and method for a send transaction results in the creation of several data records. The staging phase results in a send transaction staging record. The funding/finalizing stage results in a final (or committed) send transaction record.

As best seen in FIG. 5a, a send transaction staging record 500 may typically include the following fields:
Staging Retrieval Key 510
Sender Name 512
Sender ID Data (address, . . . ) 514
Recipient Name/Location 516
Recipient Security Data (optional) 518
Compliance Data 520
Additional Transaction Information 522
Expiration Date 524

As discussed above, the content of the Compliance Data field 520 will vary according to what compliance rules are applied and according to the above discussed options for the format of that data. Additional Transaction Information 522 can include a transaction type code or any data used to further define the type of transaction or special details of its execution. In one embodiment, a send transaction staging record will be purged as soon as a corresponding committed send transaction is created using data from the staging record. However, in another embodiment the staging record can be saved with an expiration date. The Expiration Date field 524 may be used if a user is likely to enter into a series of similar transactions. The record stays available as a reusable staging record until the expiration date. Thus, it may be re-used by the sender and agent until that expiration date to streamline the sender's next agent interaction. Because the staging record is intended to enable finalizing any send transaction for which the sender has provided sufficient data to pass a compliance test associated with applicable compliance windows, the send staging record stores no proposed send amount.

The data center 120 can perform an analysis of usage history for a particular sender or for a relevant subset of senders to determine send transaction frequency. Such empirical analyses can be used to determine one or more appropriate time periods (e.g., three weeks, 35 days) for setting an expiration date, so that records last long enough to be useful for the next transaction but do not get stale and are not kept unnecessarily.

As best seen in FIG. 5b, a committed send transaction record 550 may typically include the following fields:
Send Transaction Key or Identifier 560
Send amount 562
Service Type 564
Fees 566
Sender Name 568
Sender ID Data (address, . . . ) 570
Recipient Name/Location 572
Recipient Security Data (optional) 574
Compliance Data 576
Additional transaction information 578
Retention Information (optional) 580
Status 582

The fields in this record are self-evident or have been discussed above, with certain exceptions. The Service Type field permits the send transaction to be performed with different modes of payout, other than a recipient visiting an agent for receive fulfillment. In areas where home delivery of the payout is available, or other forms of pick-up or delivery, these service types can be specified here. The Recipient Security Data is a field that is used when it is desirable that identity of the recipient be better authenticated before payout. Here, in addition to whatever compliance information is required of a recipient, the recipient must answer a test question or provide some other identifying information that is defined by this field. The use of this field can be initiated by the sender or by the financial institution, for fraud deterrence. The Status Field is of particular importance because it defines whether the payout liability is still open (ready to receive) or is closed, because payout has been made. The optional Retention Data may be present to specify a period for keeping the record, which may be a regulatory requirement or part of the financial institution's record retention policy.

The committed send transaction records are records that represent the financial institution's obligations to make payments, as incurred by the agents and their interactions with the data center. Accordingly, these are normally kept in a database with high security levels against tampering and with advanced back-up and other disaster protection.

FIG. 6 is a schematic diagram showing the fields used in a receive staging record 600. A receive transaction staging record 600 may typically include the following fields:

Staging Retrieval Key 610
Recipient Name 612
Recipient ID Data (address, . . . ) 614
Send Transaction Pointer 616
Recipient Security Data (optional) 618
Compliance Data 620
Additional Transaction Information 622
Expiration Date (optional) 624

As discussed above, the content of the Compliance Data field 620 will vary according to what compliance rules are applied to the receive transaction and according to the above discussed options for the format of that data. The Send Transaction Pointer is used to locate the committed send transaction record. This may be a direct pointer or a pointer to a index of some other list of pointers.

For all of the above records, the fields may contain the data itself or a pointer to it and may be structured as a flat file or according to the rules for a relational database or other suitable database format.

Payment Transactions. In addition to the send and receive transactions, the system and method described are suitable also for a payment transaction whereby a sender may send money to one of a list of billers that have developed a payment processing arrangement with the financial institution. Such billers may be utilities, car purchase financing organizations and the like. Referring again to FIG. 1, here the sender stages a send to make a payment to the biller by calling the CSR 30 and identifying the biller and the proposed payment/send amount. Once this has been staged, then the sender 10 goes to an agent terminal 50 to make the payment and cause the data center 120 to create the committed send record. This send amount then corresponds to a payment that the financial institution will make to an account of the biller for crediting to the sender's account with the biller. As with a person-to-person send, fees are typically charged and paid to the agent. There is pricing performed at both staging and finalizing, and the send transaction to the biller is equally subject to the compliance rules, applied in the same way. One additional operation that may occur with a payment transaction is entry of the user's account number with the biller, and checking of that account number to determine that it follows the biller's format and content rules for such numbers.

The actions and communications as set forth in the send staging and send finalizing phase of FIG. 3 apply generally to a payment transaction, except that the recipient is a biller not an individual and is usually sufficiently identified by a biller ID number. This will correspond to a particular entity at a particular location. Recipient Security Data typically is not needed, so the field may be left blank when this type of transaction is staged or be used for other information (such as sender account number at the biller). There is no need to have receive staging and receive fulfillment, because the payment sent is settled to the biller's account by settlement arrangements between the financial institution and the biller. Status information is handled differently, because the financial institution controls the transfer to the biller's bank account, which corresponds to payout.

In another embodiment, the payment is made not to a biller but to a person or rather that person's account in an institution. Thus, the send might be made to the account of a prison innate or to a student account. Again no receive staging or fulfillment is needed.

Agent Terminal and Profile. The agent terminal 50 can take a variety of forms, including a specialized terminal with its own processor and on-board memory intended to have small counter "footprint" or a personal computer that is programmed with software to perform the desired agent operations but may also have other uses, e.g., as a component of a cash register. To communicate properly with the data center 120, the terminal must be configured. Also, the financial institution may want to ensure that the terminal 50 is governed by any business rules that have been agreed with the agent or agent group. Thus, the terminal may be configured with a profile that includes geographical information as mentioned above but also transaction size limits or services limits or options that are part of the agreed business rules. These rules can then be implemented as a transaction filter that is applied before a transaction is submitted for compliance analysis as discussed above. Thus, if a transaction is outside the agent amount limits on a send or receive, the rules at the terminal will cause that to be noted in a message displayed at the terminal, before the transaction is transmitted from the terminal to the data center. Similarly, a transaction that is not available at a particular agent can be flagged by local filtering at the agent terminal.

Although the present invention has been described with reference to preferred embodiments, persons skilled in the art will recognize that changes may be made in form and detail without departing from the spirit and scope of the invention.

I claim:

1. A method of performing a money transfer send transaction comprising:
   receiving information at a call center from a sender for a send transaction, including a proposed send amount;
   responsive to the information from the sender received at the call center, building a staging record for the send transaction, said staging record including compliance data responsive to the proposed send amount and to compliance rules;
   receiving information from an agent provided by the sender to the agent, said information including a retrieval key to identify the staging record, a requested send amount and agent location information;
   responsive to the requested send amount and the agent location information, identifying in the compliance rules at least one applicable compliance window;
   testing the requested send transaction and compliance data in the staging record for consistency with the at least one applicable compliance window;
   responsive to an affirmative test for consistency, prompting the agent to collect from the sender payment of the requested send amount and any transaction fee;
   responsive to the agent's confirmation of receipt of payment, preparing a send transaction record; and
   providing to the agent a send transaction identifier for communication to the sender.

2. The method of claim 1 wherein the compliance data is data that varies according to the amount of the send transaction and the compliance rules.

3. The method of claim 1 wherein the compliance data is data elicited from the sender based on a proposed send amount that the sender communicates to the call center.

4. The method of claim 1 wherein the compliance data includes a compliance level code derived from data elicited from the sender based on the proposed send amount that the sender communicates to the call center.

5. The method of claim 1 wherein the compliance data includes a maximum send amount derived from data elicited from the sender based on the proposed send amount that the sender communicates to the call center.

6. The method of claim 1 further comprising providing the agent instructions on identification procedures for the sender required by the compliance data, said identification procedures selected from those associated with two or more compliance windows based on the amount of the send transaction.

7. The method of claim 1 further comprising marking the send transaction record with a record retention indicator.

8. The method of claim 1 further comprising marking the staging record with an expiration date permitting its re-use until that date.

9. The method of claim 8 wherein the expiration date is empirically derived.

10. The method of claim 1 wherein the compliance data in the staging record and the compliance rules define a compliance level for at least one jurisdiction covering a range of send amounts.

11. The method of claim 1 wherein the step of testing the send amount for consistency is performed at a terminal of the agent, responsive to receipt at the terminal of a compliance window definition.

12. The method of claim 1 wherein the step of testing the send amount for consistency is performed in part at a terminal of the agent, responsive to an agent profile stored at the terminal.

13. The method of claim 1 wherein the step of testing the requested send amount for consistency is performed at a central computer to which the agent sends the requested send amount.

14. The method claim 1 wherein the compliance rules cover two or more jurisdictions and the compliance rules of each jurisdiction have two or more compliance windows for send transactions.

15. The method of claim 1, further comprising prompting the agent to examine sender credentials relative to the compliance data and to communicate the result of examining the sender credentials relative to the compliance data.

16. A system for performing a money transfer send transaction comprising:
 a processor configured to communicate with a call center and at least one agent;
 a program component for receiving information at a call center from a sender for a send transaction, including a proposed send amount;
 a program component responsive to the information from the sender received at the call center, for building a staging record for the send transaction, said staging record including compliance data responsive to the proposed send amount and to compliance rules;
 a program component for receiving information from an agent provided by the sender to the agent, said information including a retrieval key to identify a staging record, a requested send amount and agent location information;
 a program component responsive to the requested send amount and the agent location information, for identifying in the compliance rules at least one applicable compliance window;
 a program component for testing the requested send transaction for consistency with the at least one applicable compliance window;
 a program component responsive to an affirmative test for consistency for prompting the agent to collect from the sender payment of the requested send amount and any transaction fee;
 a program component responsive to the agent's confirmation of receipt of payment for preparing a send transaction record; and
 a program component for providing to the agent a send transaction identifier for communication to the sender.

17. The system of claim 16 wherein the compliance data is data that varies according to the amount of the send transaction and the compliance rules.

18. The system of claim 16 wherein the compliance data is data elicited from the sender based on a proposed send amount that the sender communicates to the call center.

19. The system of claim 16 wherein the compliance data includes a compliance level code derived from data elicited from the sender based on the proposed send amount that the sender communicates to the call center.

20. The system of claim 16 wherein the compliance data includes a maximum send amount derived from data elicited from the sender based on the proposed send amount that the sender communicates to the call center.

21. The system of claim 16 further comprising providing the agent instructions on identification procedures for the sender required by the compliance data, said identification procedures selected from those associated with two or more compliance windows based on the amount of the send transaction.

22. The system of claim 16 further comprising marking the send transaction record with a record retention indicator.

23. The system of claim 16 further comprising marking the staging record with an expiration date permitting its re-use until that date.

24. The system of claim 23 wherein the expiration date is empirically derived.

25. The system of claim 16 wherein the compliance data in the staging record and the compliance rules define a compliance level for at least one jurisdiction covering a range of send amounts.

26. The system of claim 16 wherein the step of testing the send amount for consistency is performed at a terminal of the agent, responsive to receipt at the terminal of a compliance window definition.

27. The system of claim 16 wherein the step of testing the send amount for consistency is performed in part at a terminal of the agent, responsive to an agent profile stored at the terminal.

28. The system of claim 16 wherein the step of testing the requested send amount for consistency is performed at a central computer to which the agent sends the requested send amount.

29. The system claim 16 wherein the compliance rules cover two or more jurisdictions and the compliance rules of each jurisdiction have two or more compliance windows for send transactions.

30. The system of claim 16, further comprising prompting the agent to examine sender credentials relative to the compliance data and to communicate the result of examining the sender credentials relative to the compliance data.

31. A computer program stored in a machine readable medium for performing a money transfer send transaction comprising:

a program component for receiving information at a call center from a sender for a send transaction, including a proposed send amount;

a program component responsive to the information from the sender received at the call center, for building a staging record for the send transaction, said staging record including compliance data responsive to the proposed send amount and to compliance rules;

a program component for receiving information from an agent provided by the sender to the agent, said information including a retrieval key to identify a staging record, a requested send amount and agent location information;

a program component responsive to the requested send amount and the agent location information, for identifying in the compliance rules at least one applicable compliance window; a program component for testing the requested send transaction for consistency with the at least one applicable compliance window;

a program component responsive to an affirmative test for consistency for prompting the agent to collect from the sender payment of the requested send amount and any transaction fee;

a program component responsive to the agent's confirmation of receipt of payment for preparing a send transaction record; and a program component for providing to the agent a send transaction identifier for communication to the sender.

* * * * *